US005092124A

United States Patent [19]

White et al.

[11] Patent Number: 5,092,124

[45] Date of Patent: Mar. 3, 1992

[54] CONDITION-RESPONSIVE SNAP-ACTING MEMBER, DEVICE AND METHOD OF MAKING

[75] Inventors: Sheldon S. White, Brookline; Lawrence E. Cooper; Rene N. Langlais, both of Attleboro, all of Mass.

[73] Assignee: Texas Instruments Incorporated, Dallas, Tex.

[21] Appl. No.: 631,554

[22] Filed: Dec. 21, 1990

[51] Int. Cl.$^5$ .................. F03G 7/06

[52] U.S. Cl. .................. 60/527; 219/121.65; 219/121.66

[58] Field of Search .................. 60/527, 528, 529; 219/121.66, 121.65, 121.6, 121.85

[56] References Cited

U.S. PATENT DOCUMENTS

| | | | |
|---|---|---|---|
| 3,244,412 | 4/1966 | Robinson et al. | 219/121.65 |
| 3,378,656 | 4/1968 | Johnson | 200/82 |
| 4,646,051 | 2/1987 | Ruszczyk et al. | 337/107 |
| 4,703,298 | 10/1987 | Gerson | 337/102 |

*Primary Examiner*—Allen M. Ostrager

*Attorney, Agent, or Firm*—Russell E. Baumann; Richard L. Donaldson; Rene E. Grossman

[57] ABSTRACT

A movable condition-responsive member such as a snap-acting dished metal member is mounted in a condition-responsive device to move between spaced dispositions such as between the original and inverted dished configurations of a dished metal member in response to occurrence of selected pressure, force or temperature conditions. The member is arranged to engage and move the device control elements during such movement to perform control functions. A series of artifacts such as laser-melted portions of the metal materials embodied in the member are provided in the surface of the member, typically after the member is assembled in the control device. Each artifact establishes a local pattern of stresses in the member at variance with a pattern of stresses in the member adjacent to the artifacts, and the artifacts cooperate to precisely determine the condition which results in the snap-acting member movement. The member is intially formed and processed in conventional manner to provide the member with intended initial condition-response properties differing by selected value from the properties ultimately to be established in the member, and is tested to display its actual properties as initially formed. The artifacts are each proportioned to modify the condition-response properties by only a small increment of said value and they are formed in sequence, typically after member assembly in the device, as the response of the device is tested to precisely determine the condition-response properties of the member in the device.

32 Claims, 3 Drawing Sheets

CONDITION-RESPONSIVE SNAP-ACTING MEMBER, DEVICE AND METHOD OF MAKING

BACKGROUND OF THE INVENTION

The field of the invention is that of condition-responsive members and devices, and the invention relates more particularly to condition-responsive members and devices such as dished metal members adapted to move between spaced dispositions or the like such as between original and inverted dished configurations, preferably with snap-action, in response to occurrence of predetermined bias, force, deflection, temperature or pressure conditions or the like.

Many different types of condition-responsive control devices such as thermostats, motor protectors mechanical switches and pressure switches and the like use condition-responsive dished metal members or other bistable or movable members or the like to actuate the devices to move between control positions or change applied forces or the like in response to change in conditions. Dished metal members for example are commonly arranged to move between original and inverted dished configurations with snap action in response to occurrence of a selected temperature, force, or pressure condition or the like and are typically arranged in a condition-responsive device to engage and move a control element of the device to perform a selected control function when the snap-acting member movement occurs. Frequently the condition-responsive member is adapted to move between its two spaced dispositions in response to occurrence of a first condition and then to return to its previous configuration, typically with snap-action, on occurrence of a second condition. In the condition-responsive devices it is usually important that the condition-responsive member move in response to the occurrence of precisely predetermined temperature or pressure conditions or the like and the manufacture and processing of dished metal members in attempting to make such members in an accurate and economical manner is well developed and well known and does result in production of useful and reliable condition-responsive devices in many respects. Frequently, however, the manufacturing tolerances encountered during manufacture of the condition-responsive members and then during their assembly in condition-responsive devices are such that, particularly where the members and devices are manufactured and assembled using large volume or automated manufacturing methods, a substantial number of the members and devices as manufactured are found to be out of tolerance. The absence of the desired precision is in some respects due to difficulties in manufacturing the control members with desired accuracy and in part due to difficulty in arranging the control members in control devices in such a way as to be consistently subjected to the same forces within the assembled devices. That is, it is found that, when the condition-responsive members are tested after being formed, substantial numbers of the members will display condition-response properties which are out of tolerance so that high rejection rates are commonly encountered in member manufacture. Sometimes the rejected members are subjected to being formed again in attempting to bring the members into tolerance but the rehandling required for such re-forming is often not economical. Most important, when the members are mounted in condition-responsive devices, the members are commonly engaged by control elements of the devices which apply forces to the members and which change the condition-responsive properties of the members in the device. As a result, when the devices are tested after assembly, they frequently display condition-response properties which are out of tolerance so that high rejection rates are again encountered in device manufacture. Again the rejected devices are commonly adjusted by means of adjusting screws, bending of member supports, etc., to calibrate the devices but again device calibration is also inconvenient and expensive. In the case of rejection of devices, the rejection results in loss of the full cost of the assembled device.

BRIEF SUMMARY OF THE INVENTION

It is an object of the invention to provide a novel and improved condition-responsive member; to provide a novel and improved condition-responsive device using such a member; to provide such a member adapted to move between first and second dispositions in response to occurrence of a precisely predetermined condition; to provide such a device which is adapted to perform a control function in response to occurrence of a precisely predetermined condition; and to provide novel and improved methods for making the condition-responsive members and devices.

Briefly described, the novel and improved condition-responsive member of the invention comprises a member which is adapted to move between spaced dispositions in response to occurrence of a condition and which, when provided on a condition responsive device, is adapted to engage and to apply a force and/or move a control element of the device to perform a control function. In a preferred embodiment, the condition-responsive member comprises a metal member having a dished portion which has an original dished configuration under one condition of temperature or pressure or the like and which moves with snap action to an inverted dished configuration on occurrence of a second condition. In one embodiment of the invention, the device comprises a thermostat or a motor protector or the like and the condition-responsive member comprises a thermostat metal material having metal layers which undergo differential thermal expansion during temperature change, thereby to move from an original to an inverted dished configuration with snap action at a particular temperature. The member is arranged within the device so that the member engages and moves a control element of the device to perform a control function at the particular temperature at which snap-acting member movement occurs.

In accordance with the invention, the condition-responsive member as initially formed is of conventional structure so that it is not further described and it will be understood that the member has a selected pattern of stresses established in the member materials under one condition or set of conditions, will undergo modification of that pattern of stresses as the condition changes, and will move to perform its desired control functions or the like when the pattern of stresses is sufficiently modified. Typically for example, where the condition-responsive member comprises a dished thermostat metal member as noted above, the member has a selected pattern of stresses established in the member materials when the member is at a first temperature, the member will undergo modification of that pattern of stresses during temperature change as the member materials experience differential expansion or contraction, and the member will move to its inverted dished configuration when the pattern of stresses is sufficiently modified to move the member material through an over-center position with snap-action at a particular temperature. The member, typically comprises a thermostat member which carries a contact into and out of engagement with a mating contact in an electrical switch in response to temperature change, or a bistable snap-acting member having a tongue element adapted to be moved with snap action through an opening in a tongue support to perform a control function in response to increasing deflection force applied to the tongue, the like within the scope of the invention.

In another preferred embodiment of the invention, for example, the condition-responsive device comprises a pressure switch and the condition-responsive dished metal member comprises a monometal which is adapted to move from an original to an inverted dished configuration with snap-action in response to application of a particular pressure force or the like. The pressure-responsive member is arranged within the pressure-responsive device so that the member engages and moves a control element of the device to perform a control function at the particular applied pressure level at which the snap-acting movement occurs. The pressure-responsive member as initially formed is also of conventional structure and has a selected pattern of stresses established in the member material retaining the member in an original dished configuration under one applied pressure, is adapted to undergo modification of that pattern of stresses during applied pressure change, and will move to an inverted dished configuration when the pattern of stresses is sufficiently modified to permit the member material to move through an over-center position with snap-action at a particular applied pressure. It should also be understood that although the condition-responsive members are typically formed of metal, they are also formed of other materials having the described stress pattern therein within the scope of the invention.

In accordance with the invention, however, the dished member or other condition-responsive member is initially formed with condition-response properties which differ by a selected value from the condition-response properties ultimately intended to be established in the member; the member is tested to determine its actual condition-response properties as initially formed; and the member is then provided with a series of artifacts each of which establishes a local pattern of stresses in the member material which is at variance with the pattern of stresses in the member adjacent to the artifacts and each of which modifies the condition-responsive properties of the initially formed member by a selected, preferably small, increment of the noted value by which the initially-formed condition-response properties of the member differ from the ultimately intended properties of the member. In that arrangement, the initial forming of the dished member is accomplished with the customary tolerance but with assurance that the member properties are adapted to be modified and brought into precise control. A sufficient number of the artifacts are formed as the member response is continuously tested until a sufficient member of the artifacts is provided so that the member snaps, whereby the artifacts cooperate with each other and with the pattern of stresses provided in the initially-formed member to provide the member with condition-response properties precisely corresponding to the properties ultimately intended to be established in the member.

Where the preferred embodiment of the condition-responsive device comprises a thermostat for example, the metal member comprises a composite of thermostat metal laminate having metal layers of relatively high and low coefficients of thermal expansion on concave and convex sides respectively of an original dished member configuration so that the member as initially formed is adapted to move to inverted dished configuration with snap action at a particular temperature which is a selected value such as several degrees Centigrade, or even up to 20 degrees or more, higher than the condition-response temperature ultimately intended to be provided in the member. The condition-response temperature which the member as initially formed actually displays is then determined by testing the member in any conventional manner. Then a series of spaced local areas of the convex member surface are exposed to a laser beam in sequence, preferably in brief pulses to form desired artifacts in the member. Preferably for example, the member is brought to the ultimately intended response temperature, and the artifacts are then formed in sequence until the member snaps to its inverted configuration at that desired response temperature. The laser beam is preferably of sufficient intensity to briefly melt the member material in each of the local surface areas and then to permit cooling of the local areas to form a series of lens-shaped artifacts at the member surface without significantly altering the overall temperature of the member, the proportions of each artifact being selected to lower the condition-response temperature by a relatively small increment, such as one-tenth of a degree or one degree Centigrade, of the selected value noted above. That is, the number of artifacts cooperate to lower the condition-response temperature of the member as initially formed to a sufficient extent to provide the member with the condition-response temperature ultimately intended to be provided in the member. In the preferred embodiment of the invention, the condition-responsive member is assembled in the condition-responsive device so that the member is subjected to device assembly forces before being exposed to the noted laser beam. The series of artifacts is then adapted to modify the condition-response temperature of the member to a sufficient extent to provide the device with the desired condition-response temperature ultimately intended to be provided in the device. In a preferred embodiment of the invention, the concave side of the condition-responsive member is also provided with a series of artifacts, preferably after member assembly in a device, to precisely predetermine the reset response temperature at which the member is adapted to return to its original dished configuration with snap action in an improved manner. In that regard, the formation of artifacts in a member to determine the reset condition of the member can in some cases modify the initial response condition of the member and, if so, the amount of modification can be anticipated and allowance made in first determining the initial response condition, or the determination of the initial and reset responses is accomplished by iteration until satisfactory responses are achieved.

Where the preferred embodiment of the condition-responsive device comprises a pressure switch, the metal member as initially formed preferably comprises a monometal material which has an original dished configuration with a concave and convex side and which is adapted to move to an inverted dished configuration with snap action when a particular pressure is applied to the convex side of the member, the particular applied pressure being a selected value such as several pounds per square inch higher than the condition-response pressure ultimately intended to be provided in the member. The member is tested, by exposing the member to the ultimate response pressure for example and preferably after assembly in the pressure-responsive device, a series of artifacts as above described are formed in the convex side of the member to lower the pressure-response properties of the member to the level ultimately intended to be provided in the member and/or the device. If desired, the concave side of the member is also provided with a series of artifacts to precisely determine the reset pressure of the member in an improved manner.

In these ways, the novel and improved condition-responsive members and devices are provided with more accurate performance characteristics in a more economical, reliable and uniform manner, particularly adapted for automated production of such members and devices.

DESCRIPTION OF THE DRAWINGS

Other objects, advantages and details of the novel and improved members, devices and methods of the invention appear in the following detailed description of preferred embodiments of the invention, the description referring to the drawing in which.

DESCRIPTION OF THE PREFERRED EMBODIMENTS

Figure 1:
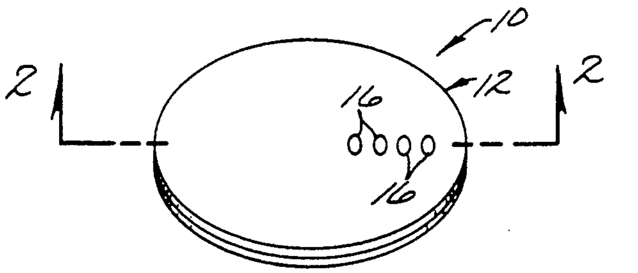
FIG. 1 is a perspective view of the novel and improved condition-responsive member of the invention.
Figure 2:
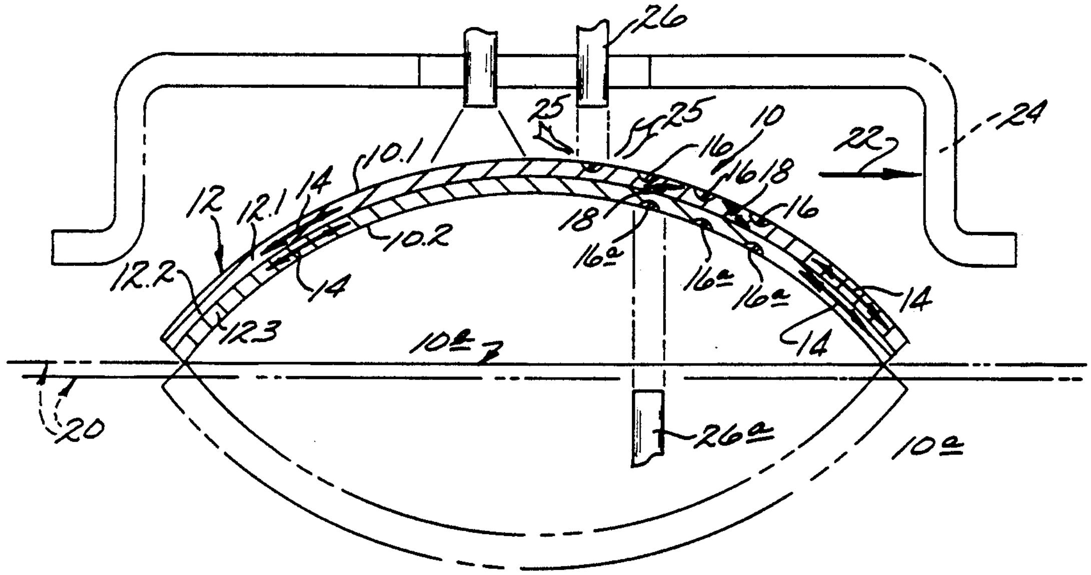
FIG. 2 is a section view to enlarged scale along line 2—2 of FIG. 1.

Referring to the drawings, 10 in FIGS. 1–2 indicates the novel and improved condition-responsive member of the invention. In preferred embodiment, the member is shown to have an original dished configuration as indicated in solid lines in FIG. 2 and is adapted to move with snap action to a second or an inverted dished configuration as indicated by broken lines 10*a* on occurrence of a selected condition. In one preferred embodiment of the invention as shown in FIGS. 1–2, the member comprises a thermostat metal material 12 in which a first metal layer means such as a single layer of metal 12.1 of a material of relatively high coefficient of thermal expansion is disposed on the concave side 10.1 of the member and is metallurgically bonded along an interface 12.2 to a second metal layer means 12.3 of a material of relatively lower coefficient of thermal expansion disposed on the convex side 10.2 of the member, the member being adapted to move from its original dished configuration to its inverted dished configuration when the member is heated to a selected-condition response temperature of the member. In that structure, the member has a general pattern of stresses therein as is diagrammatically indicated in FIG. 2 by the arrows 14 and in, in accordance with this invention, the member has a series of artifacts 16 therein each of which establishes a local pattern of stress in the member as indicated by arrows 18 which is at variance with a pattern of stresses in the member adjacent to the artifacts, the artifacts being adapted to cooperate with each other and with the configuration and other characteristics of the member to precisely determine the actuating temperature of the member.

In accordance with the method of the invention for making the member 10, the thermostat metal material 12 is initially formed in any conventional manner such that the member is adapted to move from its original dished configuration to its inverted dish configuration with snap action at a particular temperature which exceeds by a selected value (such as three to twenty degrees Centigrade or the like) the actuating temperature characteristics ultimately to be provided in the member 10. That is, the member is initially formed of selected materials with selected thicknesses and is provided with a selected dished shape and temper etc. in conventional manner but with an actuating temperature higher than the actuating temperature ultimately intended for the member. As procedures for making such dished metal members are well known they are not further described and it will be understood that the member as initially formed has a selected pattern of stresses established in the member as is diagrammatically indicated by the arrows 14 while the member is at a first temperature such as room temperature, that the pattern of stresses in the member will undergo modification during temperature change as the metal layer means 12.1, 12.3 undergo differential thermal expansion, and that the member will move to its inverted dished configuration when the pattern of stresses is sufficiently modified to move the member material through an over-center position indicated at 10*b* with snap action at a particular temperature.

Preferably the member as initially formed from the thermostat metal 12 is tested in any conventional manner as described below to determine either directly or indirectly the particular temperature at which the member as initially formed is adapted to move to its inverted dished configuration. The member is then provided with a series of artifacts 16 each of which establishes a local pattern of stress as diagrammatically indicated by the arrows 18 which is at variance with the pattern of stresses in the member adjacent to the artifacts. Each artifact is proportioned to lower the condition-response temperature of the member by a relatively small increment (such as one-tenth or one-half degree C. or the like) of the selected value noted above, the number of artifacts being selected as described below to modify the condition-response temperature to substantially correspond (within less than one-half degree C. and preferably less than one-tenth degree C. for example) of the condition response temperature intended to be provided in the member 10.

In the preferred embodiment shown in FIG. 1 for example, the initially formed member with a condition-response temperature a selected value higher than intended for the finished member is advanced with its convex side 10.2 up on a belt or the like indicated by broken lines 20 in the direction indicated by arrow 22 through an oven indicated by broken lines 24, the temperature of the oven being maintained in any conventional manner to be at the condition-response temperature ultimately to be provided in the finished member 10. In that way the oven temperature indirectly performs a continuous test of the member response temperature indicating that, as long as the member retains its original configuration, the oven temperature is lower than the response temperature of the member. A beam from a laser as indicated at 26 is then directed onto the convex surface 10.1 of the initially-formed member, preferably in a series of brief pulses, to form a, series of spaced artifacts 16 in the convex member surface. Preferably the laser beam intensity is regulated in conventional manner so that the beam briefly melts the metal material of the member at the very surface of the member in the local area on which the beam impinges and then is withdrawn or pulsed to permit the melted metal area to cool as indicated at 25 to form a generally lens-shaped artifact 16 in situ as illustrated in FIG. 2. In that arrangement, each artifact is adapted to lower the condition-response temperature of the member by a small increment of the value by which the response temperature initially exceeded the intended response temperature and is adapted to accomplish that result without significantly increasing the overall temperature of the member. Accordingly, when the series of artifacts 16 provided in a line across the member for example lowers the member response temperature to the temperature of the oven, the member snaps into its inverted dished configuration to indicate that formation of additional artifacts is not required. Preferably for example a snap sensor 28 such as a conventional proximity sensor or the like is arranged to interrupt operation of the laser 26 when the condition-response temperature of the member is sufficiently modified to move with the snap action, thereby to precisely determine the ultimate operating or actuating temperature of the member.

In that way, the condition-responsive member 10 is adapted to be manufactured with very precisely predetermined condition-response properties with improved economy, reliability and uniformity from member to member. If desired, a series of artifacts **16*a* are provided in the concave surface of the member to precisely predetermine the reset temperature of the member 10. That is, where the temperature responsive member 10 is intended to return to its original dished configuration with snap action when the member subsequently cools to a temperature lower than its actuating temperature, the member as initially formed is provided with a reset temperature a selected value below the ultimately desired reset temperature. The member is then provided with a series of artifacts 16*a* by a laser beam as indicated diagrammatically at 26*a* in FIG. 2. Although the laser beam apparatus 26*a* is illustrated as impinging on the concave side 10.2 of the member in FIG. 2, it will be understood that the artifacts 16*a* are preferably formed on that side of the member while the member is in its inverted dished configuration. That is, the dished member in its inverted configuration is passed through an oven held at the ultimately desired reset temperature and is provided with a series of artifacts on its convex surface until its response temperature is modified to the oven temperature, at which point the provision of other artifacts is ended. In that way, the oven heating and sensing arrangement described above is also suitable for determining the reset temperature of the device as will be understood. If desired the members are passed between two ovens in sequence with turn-over of the members in between for setting initial and reset temperatures. The series of artifacts provided in the member are preferably provided in the member surfaces and preferably spaced in a line from rim to crown of the dished member configuration as shown in FIGS. 1-2** for convenience in manufacture. On the other hand, the artifacts are desirably spaced somewhat from the crown of the convex dished member surface to avoid factors which might limit or reduce service life. Where that is a possible concern, it is sometimes preferable to provide the artifacts in a ring or circle spaced around the crown of the member. However each of these factors is adapted to be modified within the scope of the invention. For example, the artifacts are adapted to be formed incrementally while overlapping each other, to be formed in a line tangential to the member axis, or even to be somewhat random in location within the scope of the invention. The artifacts are also adapted to be formed in such smaller increments or the like or in such a manner as to be not subject to visible observation where the artifacts each establish the local pattern of stress at variance with the pattern of stress adjacent to the artifacts and where each artifact in the series provides an incremental modification of the response temperature of the member.

It should also be noted that, in some instances, the forming of artifacts to adjust a reset condition of the member may sometimes effect change in the initial response property of the member. If so, it would be possible to anticipate such change in providing the series of artifacts which determines the initial response condition, whereby the subsequent change during setting of the reset temperature brings the initial response condition to the precisely desired level. Alternately, if desired, the dished member is adapted to be processed as above described more than once to progressively modify the initial and reset conditions in an iterative way until the final response properties are determined. It should be noted that, depending on the member properties such as thickness, etc., it is frequently found that the setting of the reset condition as above described does not adversely modify the previously set initial condition response properties.

Figure 8:
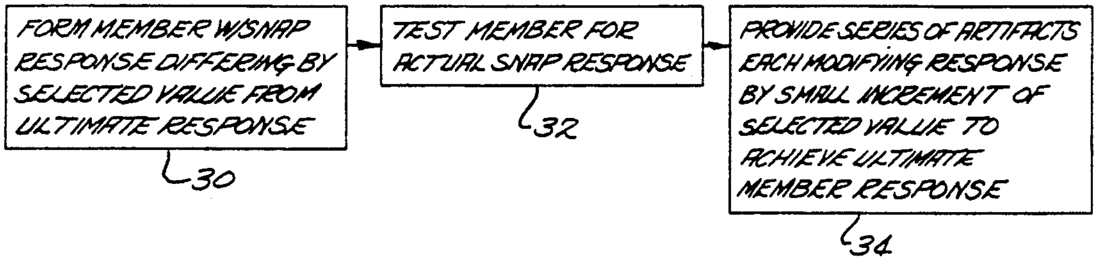
FIG. 8 is a block diagram illustrating the novel and improved method of the invention.

It should also be understood that the artifacts are also adapted to be formed by methods other than those using a laser beam or the like although the laser beam arrangement as above described is to be preferred because forming of the artifacts using the beam does not in itself tend to cause snap acting movement of the member as the artifacts are being formed. For example, the series of artifacts is adapted to be formed by sand blasting of the local artifact areas, or by impinging the surface with a striking tool at a series of locations or by providing a series of weld or solder spots or the like on the member surface within the scope of the invention. Thus as shown in FIG. 8, the method of the invention comprises initially forming a dished member in conventional manner with a snap response temperature which differs by a selected value from the response temperature ultimately to be provided in the member as indicated at 30 in FIG. 8; the member is then tested directly or indirectly to determine its actual snap response temperature as indicated at 32 in FIG. 8; and a series of artifacts are provided to modify the member response by increments of that selected value to precisely predetermine the member response temperature as indicated at 34 in FIG. 8.

It should also be understood that where a plurality of dished condition-responsive members as above described are passed through processes of manufacture as illustrated above, the members will require provision of different number of artifacts depending on the precision with which the member was initially formed, some members possibly requiring provision of no artifacts or perhaps only a single one. However, the group of members as processed comprises a group having very precisely determined properties which are adapted to be used in device manufacture, etc., in a convenient and improved manner.

Figure 3:
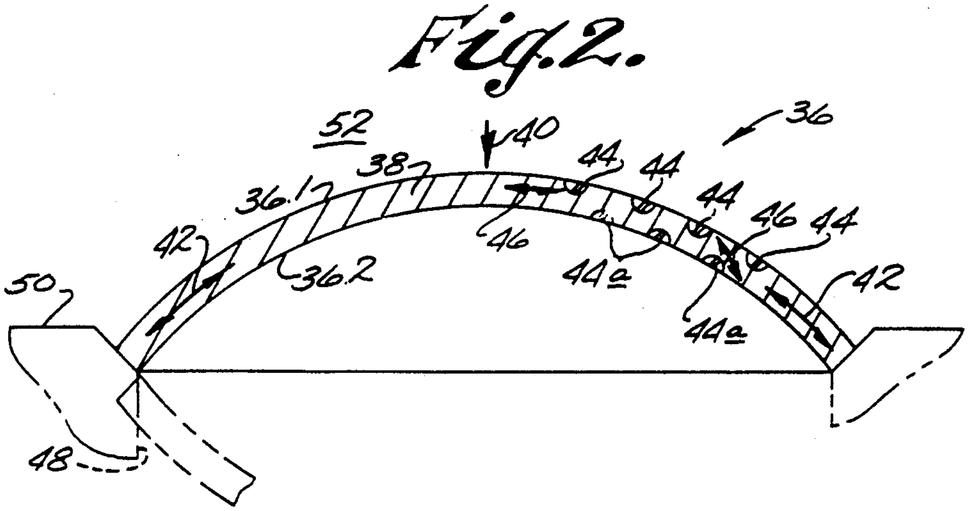
FIG. 3 is a section view similar to FIG. 2 illustrating an alternate embodiment of the invention.

In another preferred embodiment of the invention as indicated at 36 in FIG. 3, the condition-responsive member of the invention comprises a pressure-responsive member, preferably of a monometal material 38, which is adapted to move from the original dished configuration shown in solid lines in FIG. 3 to an inverted dished configuration shown in broken lines in FIG. 3 when a fluid pressure or other similar force of a selected level is applied to the convex side of the member as indicated by the arrow 40 in FIG. 3. In that arrangement, a pattern of stresses as indicated by arrows 42 is established in the member material when the applied pressure 40 is at one level as the member retains its original dished configuration; the pattern of stresses is modified as the applied pressure increases; and the member is adapted to move to an inverted dished configuration 36*a* when the applied pressure reaches a particular level. In the method of the invention, the pressure responsive monometal member 38 is formed in any conventional manner to have a condition-response pressure a selected value above the response pressure ultimately to be provided in the member 36. The actual response of the member is tested and a series of artifacts 44 are then formed on the convex side 36.1 of the member with a laser as described above so that each establishes a local pattern of stresses at variance with the pattern of stresses in the member adjacent to the artifacts as indicated by arrows 46 to lower the member response pressure to the response pressure intended to be provided in the member 36. Preferably for example, the member 38 as initially formed is disposed over an opening 48 in a support indicated by broken lines 50 while a fluid pressure force 52 is maintained on the convex member side. Alternately, the force 52 may be applied (either during member manufacture or during subsequent use of the member in a control application) by a controlled spring force or by deflection of a control arm or the life against the member crown with a selected force. A laser beam and proximity sensor is then used as above described for forming the artifacts 44 until the member response corresponds to the pressure 52 so that the member snaps to inverted dished configuration and operation of the laser is interrupted as will be understood. If desired, the member is adapted to be turned over and provided with artifacts 44*a* for precisely determining the reset pressure of the member as will be understood.

Figure 4:
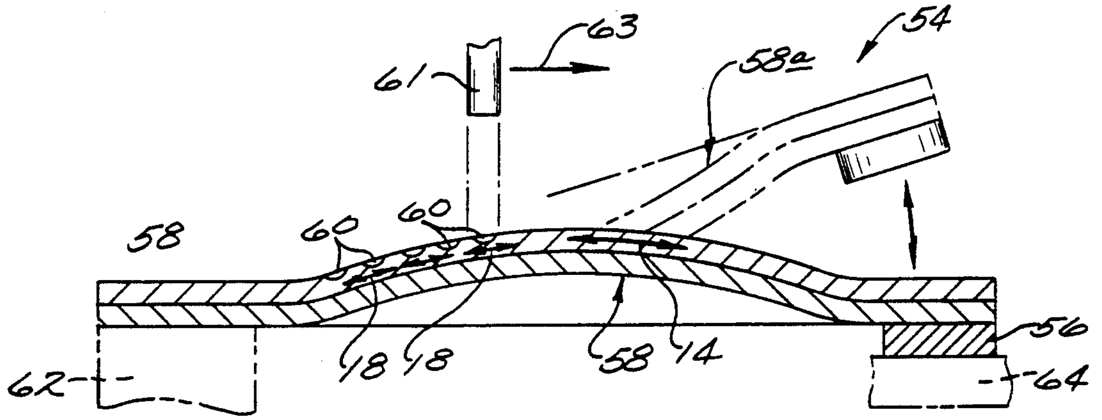
FIG. 4 is a section view similar to FIG. 2 illustrating another alternate embodiment of the invention.

In another embodiment of the invention as indicated at 54 in FIG. 4, the condition-responsive member of the invention is also adapted to be provided with a welded contact 56 or other attachment after forming of a dished member configuration in a thermostat metal strip as indicated in the solid lines 58. That is, the thermostat metal member is formed and has the contact attached in conventional manner for providing the member with a temperature response property a selected value above the response temperature ultimately to be provided in the member 54. A series of artifacts 60 are then provided in a convex side of the original dished configuration of the member by a laser 61 or the like which can be moved as indicated by the arrow 63 while the member response temperature is continually tested by holding the member in a temperature zone of the ultimate response temperature of the member 54, the number of artifacts being selected to lower member response temperature to the desired level as will be understood. In that way, the member 54 is adapted to be attached to a support indicated at 62 by welding or the like remote from the dished member portion for permitting the contact 56 normally engaged with a mating contact 64 to be disengaged from the mating contact when the member 54 moves to its inverted dished configuration 58*a* with snap action at the desired response temperature. As will be understood, a series of corresponding artifacts (not shown) is also adapted to be provided on the originally concave side of the member to predetermine the reset temperature of the member.

Figure 5:
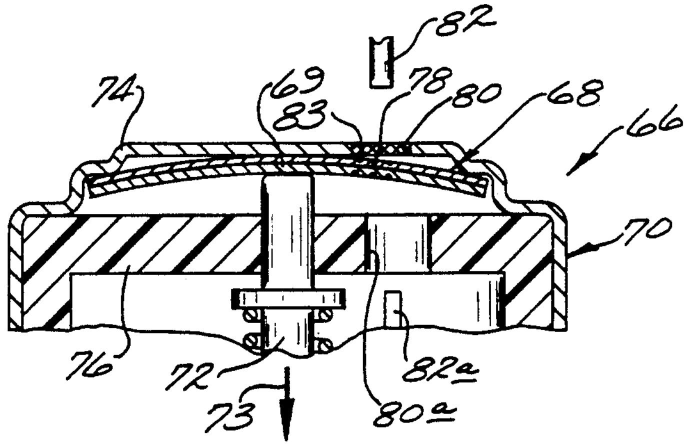
FIG. 5 is a section view along a central axis of the novel and improved condition-responsive device of the invention.
Figure 9:
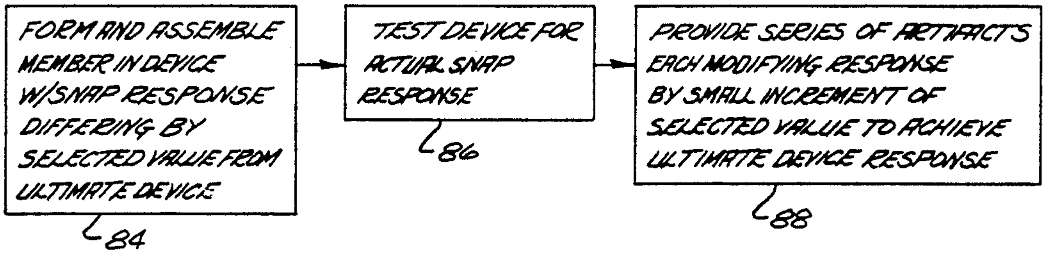
FIG. 9 is a diagram similar to FIG. 8 illustrating an alternate embodiment of the method of the invention.

In a preferred embodiment of the novel and improved condition-responsive device as indicated at 66 in FIG. 5, a dished metal condition-responsive member 68 is arranged in an otherwise conventional condition-responsive device unit 70 such as a thermostat device. The member 68 comprises a thermostat metal material 69, has an original dished configuration as shown in solid lines in FIG. 5, and is arranged to engage and move a control element 72 such as a spring-loaded motion transfer pin and to move the pin in the direction of the arrow 74 against the spring bias to perform a control function. As the condition-responsive unit 70 is of any conventional type within the scope of the invention, it is not further described and it will be understood that the thermostat member material 69 is initially formed into a dished configuration in conventional manner and is provided with a condition-response temperature which is a selected value above the response temperature the member will ultimately display in the device 66. That is, the response temperature provided in the member as initially formed is sufficient so that when the member is initially arranged in the unit 70 and is subjected to what forces are applied to the member by the pin 72, the device cap 74 or the base 76 or the like, the condition-response temperature of the member as assembled in the device is a selected value higher than the condition-response temperature intended to be provided in the device. The response temperature of the device is then tested in a conventional manner. A series of artifacts 78 as above described are then provided in the member after device assembly to lower the condition-response temperature of the member as assembled until the condition-response device is provided with its intended response temperature. Preferably for example the device cap is apertured as at 80, and a laser 82 is arranged to form the desired series of artifacts to the aperture 80, the aperture then being closed with a sealant 83 if desired. Alternately, if desired, the device cap is made from a material transparent to the laser beam to permit the beam to pass through the cap and form the artifacts. Similar artifacts are also adapted to be formed in the originally concave side of the member by a laser 82*a* through a base aperture 80*a* as will be understood. If desired the condition-responsive member 68 is adapted to be formed in the method described above with reference to FIGS. 1–2 for example to have a selected response characteristic as inserted into the device 70 and then to be provided with additional artifacts as required. That is, the method of the invention calls for forming and assembling the member in the device with a snap response property of the device differing by a selected value from the intended snap response property of the device as indicated at 84 in FIG. 9, testing of the device response in any conventional manner as indicated at 86, and providing a series of artifacts each modifying device response by a small increment of the selected value to achieve a final desired device response as indicated at 88.

Figure 6:
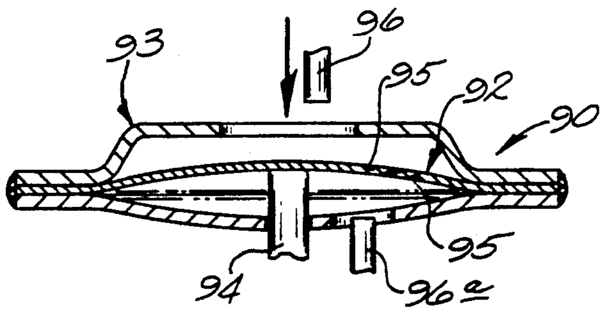
FIG. 6 is a section view similar to FIG. 5 illustrating an alternate embodiment of the device of the invention.

In another preferred embodiment of the invention as shown in FIG. 6, the condition-responsive device 90 of the invention comprises a pressure switch having a pressure responsive dished metal member 92 secured by welding or the like with the base structure 93 so that the member as initially formed and initially assembled into the device is adapted to engage and move a control element 94 to perform a control function when the member moves with snap action to an inverted dished configuration (not shown). A laser 96 or 96*a* is arranged as previously described and provides a series of artifacts 95 in the convex and/or convex sides of the member after assembly in the device and after device testing to determine the ultimate operating and/or reset pressures of the device.

Figure 7:
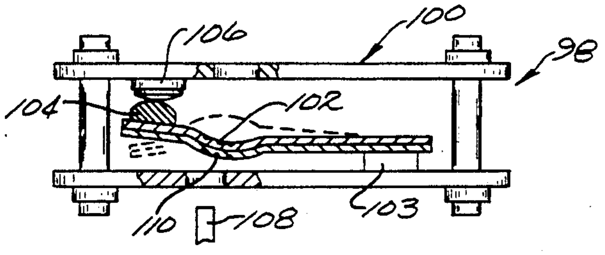
FIG. 7 is a section view similar to FIG. 5 illustrating another alternate embodiment of the device of the invention.

In another embodiment of the invention as indicated in FIG. 7, the condition responsive device 98 comprises a motor protector or a thermostat device having a dished metal condition-responsive member 102 mounted in the basic device structure 100 by welding to a boss 13 or the like to carry a welded contact 104 into and out of engagement with a fixed contact 106. A laser 108 is arranged as previously described and provides a series of artifacts 110 in the member after assembly in the device and after device testing to determine the ultimate operating temperature of the device. As will be understood provision of the series of artifacts is also adapted to adjust contact engagement force in the device.

It should be understood that although the illustrated embodiments of the invention comprise dished metal members, the members are adapted to be formed of other materials within the scope of the invention. Further, the condition-responsive members of the invention include other members movable between two control dispositions wherein the series of artifacts provided by the invention determines the precise conditions under which the member reaches each disposition during change in the condition. The condition responsive member also includes various other bistable devices which move with snap action from an original to a second disposition in response to selected conditions of deflection of the member by a temperature probe or position sensing element or the like. Such bistable devices include conventional snap action devices in which an integral metal tongue is extended over an opening in a metal frame and has its distal end trapped to hold the tongue bent in an arc disposition such that a selected deflection force applied against the arc is required to permit the tongue to move through an overcenter position with snap action to perform a control function.

The condition-responsive members and devices and methods of the invention are adapted to be modified in various ways within the scope of the invention. For example, devices and condition-responsive members are adapted to move from their original configurations in response lowering or increasing conditions, and, although the artifacts are illustrated as lowering operating temperatures or pressures, the artifacts are also adapted to be regulated and used at other member or device locations to raise operating temperatures or pressures as may be desired. It should be understood that although particular embodiments of the invention are described by way of illustrating the invention, the invention includes all modifications and equivalents of the described embodiments falling within the scope of the appended claims.

We claim:

1. A bistable condition-responsive member having an original disposition adapted to move to a second disposition with snap action in response to occurrence of a selected condition, the member having a series of artifacts therein each establishing a local pattern of stresses in the member at variance with a pattern of stresses in the member adjacent to the artifacts precisely determining the selected condition which results in movement of the member to the second disposition.

2. A condition-responsive metal member having an original dished configuration adapted to move to an inverted dished configuration with snap action in response to occurrence of a selected condition, the member having a series of artifacts therein each establishing a local pattern of stresses in the member at variance with a pattern of stresses in the member adjacent to the artifacts precisely determining the selected condition which results in movement of the member to the inverted dished configuration.

3. A condition-responsive metal member having a selected dished configuration movable to an inverted dished configuration with snap action in response to occurrence of a first selected condition and movable thereafter to return to the original dished, configuration with snap action in response to occurrence to a second selected condition, the member having a series of artifacts therein each establishing a local pattern of stresses at variance with a pattern of stresses in the member adjacent to the artifacts precisely determining the conditions which result in movement of the member to the respective dished configurations.

4. A condition-responsive member according to claim 2 wherein the series of artifacts are provided in spaced relation in a line extending from a rim to a central portion of the member.

5. A condition-responsive member according to claim 2 wherein the series of artifacts is provided in a ring spaced from and extending around at least a portion of a crown of the dished member configuration.

6. A condition responsive member according to claim 2 wherein the artifacts comprise local areas of a member surface material melted in situ in the member.

7. A thermally-responsive member according to claim 2 wherein the member comprises a thermostat metal material adapted to move from the original to the inverted dished configuration when heated to a selected temperature, the member having the series of artifacts disposed on a convex surface of the original dished configuration of the member.

8. A pressure-responsive member according to claim 2 wherein the member comprises a dished metal member adapted to move from the original to the inverted dished configuration in response to increase of pressure applied to a convex surface of the original dished configuration of the member, the member having the series of artifacts disposed spaced on the convex member surface.

9. A condition-responsive device comprising a bistable condition-responsive member having an original disposition adapted to move to a second disposition with snap action in response to occurrence of a selected condition, the member being arranged in the device to engage and move a control element in the device to perform a control function when the member moves to the inverted dished configuration, the member having a series of artifacts therein each establishing a local pattern of stresses in the member at variance with a pattern of stresses in the member adjacent to the artifacts to precisely determine the condition which results in movement of the member to the second disposition within the device.

10. A condition-responsive device comprising a metal member of an original dished configuration adapted to move to an inverted dished configuration with snap action in response to occurrence of a selected condition, the member being arranged in the device to engage and move a control element in the device to perform a control function when the member moves to the inverted dished configuration, the member having a series of artifacts therein each establishing a local pattern of stresses in the member at variance with a pattern of stresses in the member adjacent to the artifacts to precisely determine the selected condition which results in movement of the member to inverted dished configuration within the device.

11. A condition-responsive device according to claim 10 wherein the member is movable to the inverted dished configuration with snap action in response to the occurrence of a first selected condition and is movable thereafter to return to the original dished configuration with snap action in response to occurrence of a selected condition, the member having a series of artifacts therein each establishing a local pattern of stresses at variance with a pattern of stresses in the member adjacent to the artifacts precisely predetermining the selected condition which results in movement of the member to the original and inverted dished configurations respectively within the device.

12. A condition-responsive device according to claim 10 wherein the series of artifacts are provided spaced on a line extending from a rim to a central portion of the member.

13. A condition-responsive device according to claim 10 wherein the series of artifacts are provided in a ring spaced from and extending around at least a portion of a crown of the dished member configuration.

14. A condition-responsive device according to claim 10 wherein the artifacts comprise local areas of a member surface material melted in situ in the member.

15. A thermally-responsive device according to claim 10 wherein the member comprises a thermostat metal member adapted to move from the original to the inverted dished configuration within the device when heated to a selected temperature, the member having the series of artifacts disposed in a convex surface of the original dished configuration of the member.

16. A pressure responsive device according to claim 10 wherein the member comprises a dished metal member adapted to move from the original dished configuration to the inverted dished configuration in response to increase in pressure applied to a convex surface of the original dished configuration of the member, the series of artifacts being disposed in that convex member surface.

17. A group of dished metal condition-responsive members for use in manufacturing a group of condition-responsive devices, each of the members having an original dished configuration and being adapted to move with snap-action to an inverted dished configuration in response to occurrence of a selected condition, at least one of the group of members having a series of artifacts therein each establishing a local pattern of stresses in the, member at variance with a pattern of stresses in the member adjacent the artifacts precisely predetermining the selected condition which results in movement of the member to the inverted dished configuration.

18. A method for forming a bistable condition-responsive member operable in response to occurrence of a selected condition comprising the steps of providing a bistable condition-responsive member having a selected pattern of stresses therein adapted to move from an original disposition to a second disposition with snap action in response to occurrent of a condition, the member having a condition-response property differing in selected value from the selected condition, determining the condition at which the member moves with snap action to its second disposition, and providing a series of artifacts in the member, each of which establishes a local pattern of stresses in the member at variance with the pattern of stresses in the member adjacent to the artifacts and each of which modifies the condition-response properties of the member by an increment of the selected value to provide the member with condition-response properties to be operable on occurrence of the selected condition.

19. A method for forming a condition-responsive member operable in response to occurrence of a selected condition comprising the steps of providing a metal member having a selected pattern of stresses therein adapted to move from an original dished configuration to an inverted dished configuration with snap action in response to occurrence of a condition, the member having a condition-response property differing a selected value from the selected condition, determining the condition at which the member moves with snap action to the inverted dished configuration, and providing a series of artifacts in the member, each of which establishes a local pattern of stresses in the member at variance with the pattern of stresses in the member adjacent to the artifacts and each of which modifies the condition-response properties of the member by an increment of the selected value to provide the member with condition-response properties to be operable on occurrence of the selected condition.

20. A method according to claim 19 wherein a laser beam is directed onto a surface of the member to melt a selected limited surface portion of the member to form each artifact in situ.

21. A method according to claim 19 wherein the intensity of the laser beam is regulated to form the artifact free of substantial change in overall temperature of the member.

22. A method according to claim 21 wherein the member is exposed to the selected condition during provision of the artifacts and a selected number of the artifacts is provided in sequence until the member moves with snap action to its inverted dished configuration.

23. A method according to claim 22 wherein the member is moved through a zone in which the selected condition is established and the series of artifacts is provided in the member in a line.

24. A method according to claim 22 wherein the member comprises a thermally-responsive member adapted to move to the inverted dished configuration in response to heating to a selected temperature condition, the member is moved through a temperature zone of the selected temperature, and the artifact are formed in sequence in the member until the member moves with snap action to inverted dished configuration.

25. A method according to claim 22 wherein the member comprises a pressure-responsive member adapted to move to the inverted dished configuration in response to increase to a selected level of a pressure applied to a convex surface of the original dished configuration of the member, the member is disposed in a pressure zone to apply the selected level of pressure to the convex member surface, and the series of artifacts is formed in sequence in the member until the member moves with snap action to the inverted dished configuration.

26. A method for forming a condition-responsive device operable in response to occurrence of a selected condition comprising the steps of providing a metal member having a selected pattern of stresses therein adapted to move from an original dished configuration to an inverted dished configuration with snap action in response to occurrence of a particular condition, arranging the member within the device to engage and move a control element of the device when the member moves to the inverted dished configuration to perform a control function, the member having condition-response properties adapted to move the member to its inverted dished configuration with snap action within the device in response to a condition differing by selected value from the selected condition, and providing a series of artifacts in situ in the member within the device each of which establishes a local pattern of stresses in the member at variance with a pattern of stresses in the member adjacent to the artifacts and each of which modifies the condition-response properties of the member by an increment of the selected value to provide the device with condition-response properties to be operable on occurrence of the selected condition.

27. A method for forming a condition-responsive device according to claim 26 wherein a laser beam is directed onto a surface of the member to melt a selected limited surface portion of the member to form each artifact in situ.

28. A method according to claim 27 wherein the intensity of the laser beam is regulated to form the artifact free of substantial change in overall temperature of the member.

29. A method according to claim 28 wherein the member is exposed to the selected condition during provision of the artifacts and a selected number of the artifacts is provided in sequence until the member moves with snap action to its inverted dished configuration.

30. A method according to claim 29 wherein the device is moved through a zone in which the selected condition is established and a series of artifacts is provided in the member in a line.

31. A method according to claim 30 wherein the member comprises a thermally-responsive member adapted to move to the inverted dished configuration in response to heating to a selected temperature condition, the device is moved through a temperature zone at the selected temperature, and the artifacts are formed in sequence in the member until the member moves with snap action to the inverted dished configuration.

32. A method according to claim 30 wherein the member comprises a pressure-responsive member adapted to move to the inverted dished configuration in response to increase to a selected level of pressure applied to a convex surface of the original dished configuration of the member, the device is disposed in a pressure zone to apply the selected level of pressure to the convex member surface, and the series of artifacts is formed in sequence in the member until the member moves in snap action to the inverted dished configuration.

* * * * *